United States Patent
Sato

(10) Patent No.: US 8,796,967 B2
(45) Date of Patent: Aug. 5, 2014

(54) MOTOR DRIVE DEVICE, BRUSHLESS MOTOR, AND MOTOR DRIVE METHOD

(75) Inventor: Daisuke Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 126 days.

(21) Appl. No.: 13/642,460

(22) PCT Filed: Jun. 2, 2011

(86) PCT No.: PCT/JP2011/003104
§ 371 (c)(1),
(2), (4) Date: Oct. 19, 2012

(87) PCT Pub. No.: WO2011/155160
PCT Pub. Date: Dec. 15, 2011

(65) Prior Publication Data
US 2013/0038257 A1    Feb. 14, 2013

(30) Foreign Application Priority Data
Jun. 8, 2010  (JP) ................................ 2010-130706

(51) Int. Cl.
*H02P 6/08* (2006.01)
*H02P 6/12* (2006.01)

(52) U.S. Cl.
CPC ........................................ *H02P 6/12* (2013.01)
USPC ............ 318/400.22; 318/400.21; 318/400.01; 318/700; 318/434

(58) Field of Classification Search
CPC ............................... H02P 6/12; H02P 2209/07
USPC ........... 318/400.22, 400.21, 400.01, 700, 434
See application file for complete search history.

(56) References Cited

U.S. PATENT DOCUMENTS

| 7,911,168 B2 * | 3/2011 | Koike ........................... 318/432 |
| 2008/0203964 A1 | 8/2008 | Koike |

FOREIGN PATENT DOCUMENTS

| JP | 2004/173444 A | 6/2004 |
| JP | 2005/199899 A | 7/2005 |
| JP | 2007/110788 A | 4/2007 |
| JP | 2008/109835 A | 5/2008 |
| JP | 2008/187838 A | 8/2008 |
| JP | 2009/131069 A | 6/2009 |

OTHER PUBLICATIONS

International Search Report for International Application No. PCT/JP2011/003104, dated Aug. 30, 2011, 2 pages.

* cited by examiner

*Primary Examiner* — David Luo
(74) *Attorney, Agent, or Firm* — Brinks Gilson & Leone

(57) ABSTRACT

The disclosed device comprises a duty calculator for calculating a duty command value (Dty), a duty limiter for limiting the duty command value (Dty) to a value according to a limit value (L), a current flow monitor for determining that there is an overcurrent if a current value (Idet) flowing through a winding exceeds a predetermined threshold value (Ithr), and a limit value generator for generating the limit value (L). The limit value generator updates the limit value (L) at predetermined time intervals and for a value corresponding to a difference between the threshold value (Ithr) and the current value (Idet) at a time in order to decrease the current value (Idet) during a period in which the overcurrent is determined.

15 Claims, 12 Drawing Sheets

MOTOR DRIVE DEVICE, BRUSHLESS MOTOR, AND MOTOR DRIVE METHOD

This application is a 371 application of PCT/JP2011/003104 having an international filing date of Jun. 2, 2011, which claims priority to JP2010-130706 filed Jun. 8, 2010, the entire contents of which are incorporated herein by reference.

TECHNICAL FIELD

The present invention relates to a motor drive device for driving a motor by using a PWM drive method, a brushless motor equipped with the motor drive device, and a motor drive method. In particular, the invention relates to a motor drive device, a motor drive method and a motor having a function of limiting an overcurrent to the motor.

BACKGROUND ART

As motor drive devices of a type having a function of limiting overcurrent, there has been proposed in the past a motor drive device that monitors a value of electric current to a motor and restricts driving operation of the motor when a value of the detected current exceeds a threshold value (refer to Patent Literature 1 for example). Such type of the motor drive device has a PWM (Pulse Width Modulation) drive circuit, and it is configured to limit a duty factor of PWM signals to a predetermined ratio according to a detected value of the motor current when the detected value of the motor current exceeded the threshold value, that is, when an overcurrent is considered to be flowing to the motor. The conventional motor drive device of such a configuration prevents the motor from being overheated and burn-damaged due to the overcurrent by means of suppressing abrupt changes in the motor current.

However, the conventional motor drive device discussed above causes the duty factor to change instantaneously and greatly if a value of the motor current is large at the time of determination of the overcurrent since it limits the duty factor to a ratio corresponding to the value of motor current when determined that there is an overcurrent. Such an instantaneous and great change in the duty factor influences substantially upon rotation of the motor, and it thus gives rise to a problem that rotating sound of the motor increases. There is a case where the motor drive device repeats switching between a mode of small duty factor affected by the limiting function due to the overcurrent and another mode of large duty factor after relieved from the limiting function especially when the motor carries a heavy load or the like instances, and repetition of this nature causes such troubles as motor noise and large impacts to mechanical components.

PTL1: Japanese Patent Laid-Open Publication No. 2005-199899

SUMMARY OF THE INVENTION

A motor drive device of the present invention is a device for controlling rotational operation of a motor by using a pulse width modulated signal, i.e., PWM signal. The motor drive device of this invention comprises a drive controller, a duty calculator, a duty limiter, a PWM signal generator, a drive output unit, a current flow monitor and a limit value generator. The drive controller generates a driving signal for driving the motor. The duty calculator calculates a duty command value corresponding to the driving signal. The duty limiter limits the duty command value to a value according to a limit value. The PWM signal generator generates a PWM signal of a duty factor corresponding to an output value of the duty limiter. The drive output unit generates an energizing signal corresponding to the PWM signal, and energizes a winding of the motor with the energizing signal. The current flow monitor monitors a current value that flows through the winding, and determines it as being an overcurrent if the current value exceeds a predetermined threshold value. The limit value generator generates the limit value. The limit value generator is so configured that it updates the limit value at predetermined time intervals and for a value corresponding to a difference between the threshold value and the current value at a time, in order to decrease the current value during the period in which the overcurrent is determined.

A brushless motor of the present invention has a structure provided with a motor drive device of the above type according to this invention.

A motor drive method of the present invention is a method of driving a motor by controlling rotational operation of the motor using a pulse width modulated (PWM) signal, and the method comprises the following steps. They are a step of generating a driving signal to drive the motor, a step of calculating a duty command value corresponding to the driving signal, a step of limiting the duty command value to a value according to a limit value, a step of generating the PWM signal of a duty factor corresponding to an output value provided in the limiting step for limiting by the limit value, a step of generating an energizing signal corresponding to the PWM signal and energizing a winding of the motor with the energizing signal, a step of monitoring a current value that flows through the winding and determining it as an overcurrent if the current value exceeds a predetermined threshold value, and a step of generating the limit value, wherein the step of generating the limit value updates the limit value at predetermined time intervals and for a value corresponding to a difference between the threshold value and the current value at a time, in order to decrease the current value during the period in which the overcurrent is determined.

According to the structure described above, the limit value is changed stepwise while being updated little by little when the overcurrent id determined, and such changes of the limit value cause the duty factor to also change gradually into a direction of suppressing the overcurrent. It is thus capable of limiting the duty command value without causing sudden and large changes of the duty factor.

Thus provided according to the present invention are the motor drive device, the brushless motor and the motor drive method having the function of limiting the current responsive to the overcurrent without causing any increase in rotating sound of the motor since the device and the method can limit the duty command value while avoiding sudden and large changes of the duty factor.

DETAILED DESCRIPTION OF THE PREFERRED EMBODIMENTS

Figure 1:
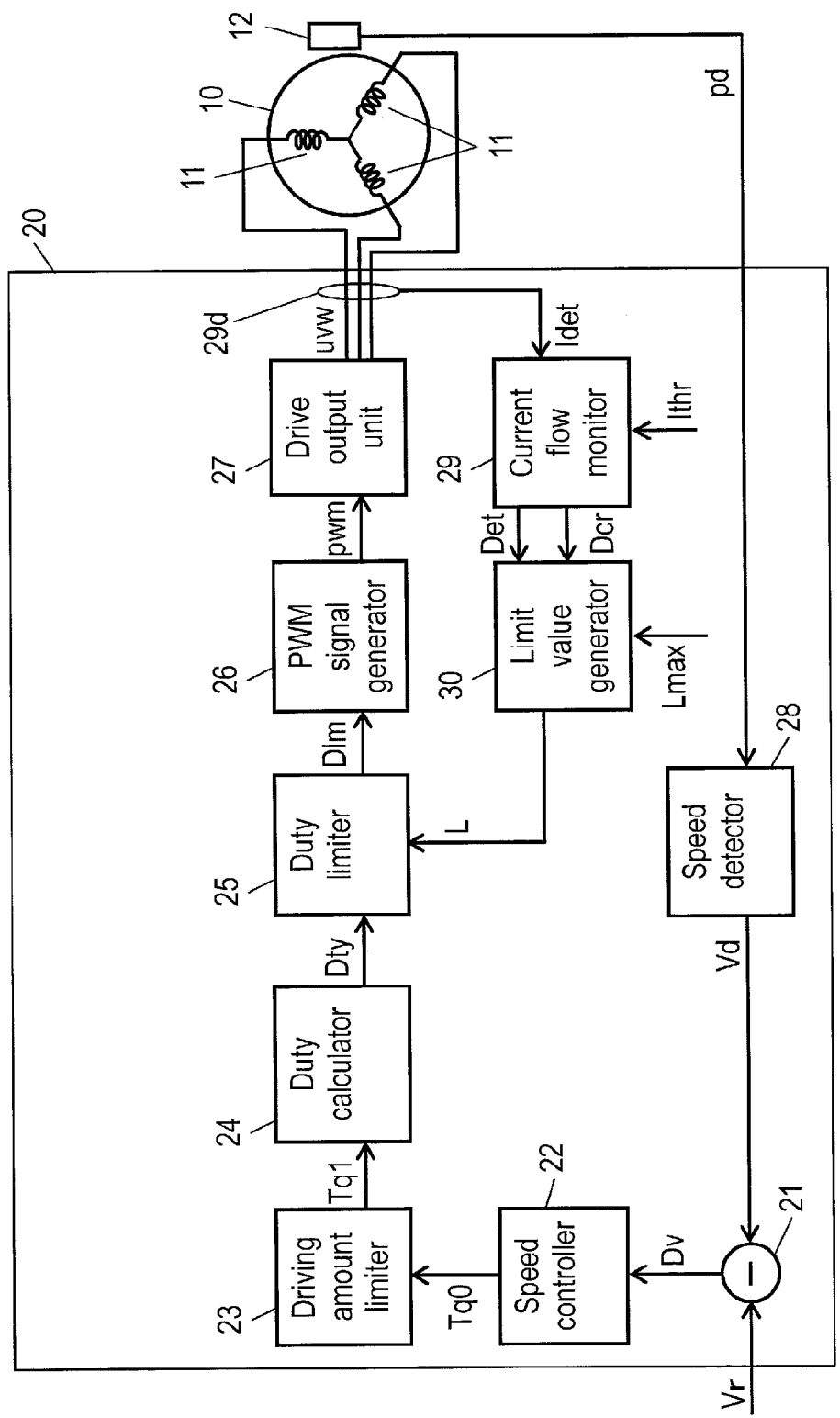
FIG. 1 is a block diagram including a motor drive device according to Exemplary Embodiment 1 of the present invention.

Referring to the drawings, description is provided hereafter of motor drive devices according to exemplary embodiments of the present invention.

Exemplary Embodiment 1

FIG. 1 is a block diagram showing a structure of motor drive device 20 according to Exemplary Embodiment 1 of the present invention.

As shown in FIG. 1, motor drive device 20 of this embodiment is connected with motor 10 and position sensor 12. Motor 10 comprises a stator having windings 11 wound thereon, and a rotor that rotates when windings 11 are energized. In this embodiment, motor 10 has windings 11 of three-phase circuit consisting of phase U, phase V and phase W, and it is rotationally driven by a pulse-width modulated (hereinafter referred to as PWM) signals supplied to each of these phases, which will be described hereafter as an example of brushless motor.

Position sensor 12 detects a rotational position of the rotor disposed inside motor 10, and outputs position indication signal pd corresponding to the rotational position. On the other hand, speed command value Vr indicating a speed command is supplied to motor drive device 20 in order to direct a rotating speed of the rotor.

Motor drive device 20 comprises subtracter 21, speed controller 22, driving amount limiter 23, duty calculator 24, duty limiter 25, PWM signal generator 26, drive output unit 27, speed detector 28, current flow monitor 29 and limit value generator 30, as shown in FIG. 1.

Position indication signal pd from position sensor 12 is supplied to speed detector 28. Speed detector 28 detects a rotating speed of the rotor of motor 10 according to a change in position, for instance, by using positional information included in position indication signal pd, and outputs speed indication value Vd showing the detected rotating speed. As stated, speed indication value Vd indicating the rotating speed of the rotor and speed command value Vr showing the specified speed to control the rotating speed are delivered to motor drive device 20 according to this embodiment. Motor drive device 20 has a speed control system configured to carry out feedback control to make the rotating speed of the rotor follow the specified speed based on speed indication value Vd and speed command value Vr.

Subtracter 21 obtains an amount of speed deviation of the detected rotating speed from the specified speed by calculating a difference between speed indication value Vd and speed command value Vr. This amount of speed deviation is supplied to speed controller 22 as speed deviation value Dv.

Speed controller 22 functions as a drive controller, in which it performs arithmetic processing such as proportional integration of speed deviation value Dv to generate and output drive value Tq0 as a driving signal indicating a drive amount used to control so that speed deviation value Dv becomes zero. Drive value Tq0 is supplied to driving amount limiter 23.

Driving amount limiter 23 limits a range of drive value Tq0, and more specifically, it controls drive value Tq0 to make it equal to or smaller than a predetermined value. In this embodiment, driving amount limiter 23 outputs drive value Tq0 by limiting its value to a drive limit value when drive value Tq0 exceeds the drive limit value. When drive value Tq0 does not exceed the drive limit value, driving amount limiter 23 outputs drive value Tq0 as it is. Driving amount limiter 23 supplies a signal processed in this manner as drive value Tq1 to duty calculator 24.

Duty calculator 24 calculates a duty factor of a pulse width in the PWM driving based on drive value Tq1 supplied to it. Specifically, duty calculator 24 calculates duty command value Dty (may be referred to as hereinafter as command value Dty where appropriate) corresponding to drive value Tq1 such that the duty factor increases as drive value Tq1 becomes larger. In other words, the larger the amount of speed deviation, the larger the duty factor becomes, for instance, to increase the driving force, thereby controlling the actual rotating speed to become equal to the specified speed. The calculated command value Dty is supplied to duty limiter 25.

Duty limiter 25 limits a range of command value Dty, and controls command value Dty so as to bring it equal to or smaller than a predetermined value. In this embodiment, duty limiter 25 outputs command value Dty by limiting its value to duty limit value L (may be referred to as hereinafter as limit value L where appropriate) when command value Dty exceeds limit value L. On the other hand, duty limiter 25 outputs command value Dty as it is when command value Dty does not exceed limit value L. Duty limiter 25 supplies an output value generated by the above process as command value Dlm to PWM signal generator 26.

More specifically, duty limiter 25 operates in a manner generally as described hereafter, as a typical example. The first thing to note is that the duty factor is confined within a range of 0% to 100% inclusive since it is a percentage of the pulse width that occupies a period of pulse cycle. On the other hand, there are cases in which command value Dty used to determine the duty factor becomes a virtual value exceeding 100% when, for instance, a strong driving force is needed since this command value Dty is a value corresponding to the driving amount. For this reason, duty limiter 25 is originally set with a value of 98%, for instance, as limit value L close to 100%, which is the upper limit of the duty factor. When command value Dty shows a value exceeding 100%, or 120% for instance, duty limiter 25 limited this value of 120% to 98%, and outputs it as command value Dlm indicating 98%.

On the other hand, when command value Dty shows a value of 80%, for instance, duty limiter 25 outputs it as command value Dlm indicating 80%.

In this embodiment, description will be provided hereafter of an example in which the larger the driving amount the larger the value of duty factor becomes, thereby increasing the driving force of motor 10.

According to this embodiment, limit value L of duty limiter 25 is not a fixed value that remains the same value at all times. Instead, duty limiter 25 limits command value Dty by an adaptive value corresponding to an amount of the electric current. In other words, limit value L can be changed to any value such as 90% and 80% depending on a value of the supplied electric current even when a value of 98%, for instance, has been set initially as limit value L. The structure and operation of generating such limit value L will be described in detail below.

PWM signal generator 26 generates a certain waveform signal for each of the phases for driving windings 11. The waveform signal is a sinusoidal wave signal when windings 11 are driven with sinusoidal wave, and the waveform signal is a rectangular wave signal when windings 11 are driven with rectangular wave. PWM signal generator 26 generates PWM signal pwm that is pulse-width modulated by a waveform signal of given amplitude based on command value Dlm. To be more specific, a duty factor of each pulse of PWM signal pwm is set to become the duty factor according to the waveform signal of the amplitude corresponding to command value Dlm. PWM signal pwm thus generated is supplied to drive output unit 27. When drive value Tq0 is so small a level that it cannot be limited by any of driving amount limiter 23 and duty limiter 25, the duty factor becomes a value corresponding to drive value Tq0. Otherwise, the duty factor becomes the value corresponding to the limited value when drive value Tq0 is limited.

Drive output unit 27 generates energizing signals uvw corresponding to the PWM signal pwm for the individual phases, and drives motor 10 by energizing windings 11 with these energizing signals.

Furthermore, current flow monitor 29 monitors an electric current that energizes and drives motor 10, according to this embodiment. Current sensor 29*d* detects current value Idet of the electric current that flows through windings 11 of motor 10. Current flow monitor 29 monitors current value Idet detected by current sensor 29*d*, and determines current value Idet as to be an overcurrent if it exceeds a predetermined threshold value. Current flow monitor 29 has threshold value Ithr set therein to perform the above process. Current flow monitor 29 determines as to whether current value Idet exceeds threshold value Ithr, and conveys a result of the determination as overcurrent determination data Det to limit value generator 30. In addition, current flow monitor 29 calculates a value of difference between threshold value Ithr and current value Idet if current value Idet exceeds threshold value Ithr, and conveys a value corresponding to the value of difference as update value Dcr to limit value generator 30.

Limit value generator 30 updates limit value L at predetermined time intervals and for a value corresponding to the difference between threshold value Ithr and current value Idet at a time, in order to decrease current value Idet during the period in which current flow monitor 29 determines current value Idet as being an overcurrent. In other words, limit value generator 30 updates limit value L at the rate of update value Dcr in a direction of decreasing current value Idet, i.e., the direction of suppressing an amount of the electric current flowing to windings 11, during the period in which overcurrent determination data Det from current flow monitor 29 indicates that the overcurrent is determined.

In addition, limit value generator 30 has maximum limit value Lmax set therein as an initial value of limit value L. For instance, this maximum limit value Lmax is preset as being limit value L at the start of operating motor 10. According to this embodiment, limit value generator 30 decreases a value of limit value L by update value Dcr from maximum limit value Lmax when current flow monitor 29 determines that there is an overcurrent. Limit value generator 30 continues to decrease limit value L little by little at the rate of update value Dcr during the period that the overcurrent is determined. As a specific example, a fixed value indicating a duty factor of 98% is set as the maximum limit value Lmax, and limit value L is initialized accordingly with a value that also indicates the duty factor of 98%. Limit value L is then decreased from the 98% duty factor to 90%, 85%, 82% and so on when determined as an overcurrent.

Furthermore, limit value generator 30 updates limit value L at predetermined time intervals and at the rate of a predetermined value in a manner to bring limit value L closer to the maximum limit value Lmax when limit value L is different from the maximum limit value Lmax during the period in which current flow monitor 29 determines that there is no overcurrent. According to this embodiment, limit value generator 30 updates limit value L at the predetermined time intervals and at the rate of the predetermined value in order to increase limit value L during the period in which current flow monitor 29 determines that there is no overcurrent, and sets limit value L to the maximum limit value Lmax if limit value L exceeds the maximum limit value Lmax. Specifically, when the overcurrent is no longer determined after limit value L becomes duty factor of 82%, for example, limit value L is then updated at the rate of a predetermined value of 5% for instance, from the 82% duty factor to 87%, 92%, 97% and so on unless the overcurrent is determined again. Limit value L is then set to 98%, assuming that the maximum limit value Lmax is preset to 98%, since limit value L exceeds 98% in the next update if continued.

Limit value generator 30 generates limit value L by executing the process stated above, and conveys the generated limit value L to duty limiter 25. Duty limiter 25 limits a range of command value Dty according to limit value L updated adaptively based on the amount of electric current.

Motor drive device 20 is configured as stated above, wherein the larger the command value Dty, i.e., the amount of speed deviation, the higher the duty factor of PWM signal pwm generated by PWM signal generator 26. When the duty factor of PWM signal pwm rises, the electric current that flows through windings 11 increases. In addition, the current flow also increases in order to increase the driving force of motor 10, for instance when the load becomes heavier. In this embodiment, limit value generator 30 has a structure adapted to generate limit value L mentioned above in order to suppress an excessive current. In particular, since limit value L generated by limit value generator 30 is decreased stepwise from the moment of determination of the overcurrent, it also suppresses command value Thy stepwise, thereby limiting command value Thy without causing sudden and large changes in the duty factor.

Further details of current flow monitor 29 and limit value generator 30 for generating such limit value L will be described below.

Figure 2:
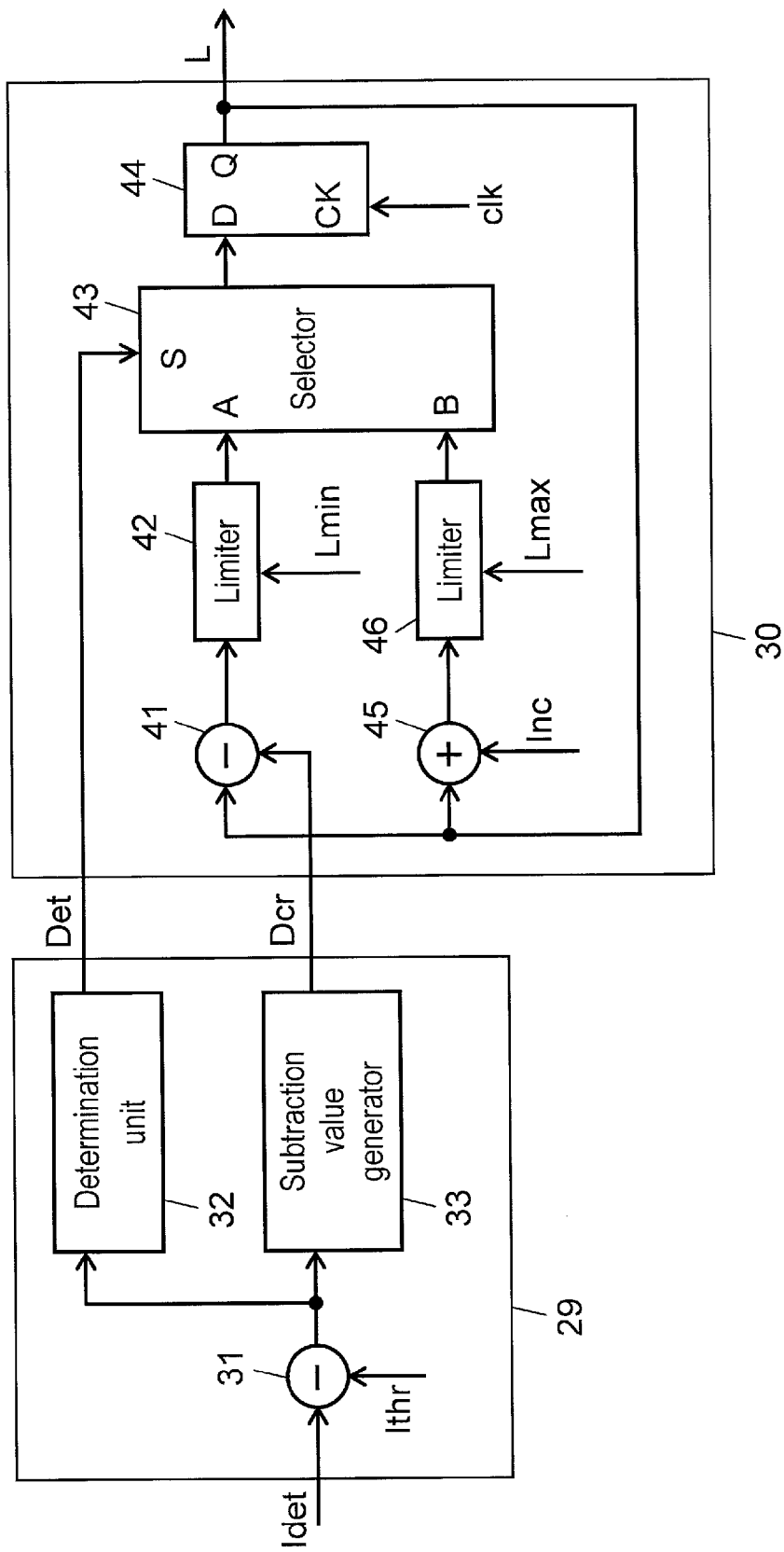
FIG. 2 is a block diagram of a current flow monitor and a limit value generator of the motor drive device.

FIG. 2 is a block diagram of current flow monitor 29 and limit value generator 30 of motor drive device 20 according to Embodiment 1 of this invention. FIG. 2 shows an exemplary structure for carrying out digital processing at predetermined cyclic periods provided by a clock signal. That is, the electric current detected by current sensor 29d is A/D converted, and current value Idet of a data stream having a value at every cycle of the clock signal is supplied to current flow monitor 29. In addition, limit value L and the like are also generated on the clock basis, and output as values at every cycle of the clock signal.

First, current flow monitor 29 comprises subtracter 31, determination unit 32 and subtraction value generator 33, as shown in FIG. 2. Subtracter 31 calculates a value of difference between current value Idet and threshold value Ithr. Determination unit 32 determines as to whether current value Idet exceeds threshold value Ithr based on the value of difference calculated by subtracter 31, and outputs a result of the determination as overcurrent determination data Det. Subtraction value generator 33 generates update value Dcr to decrease limit value L when it determines an overcurrent based on the value of difference calculated by subtracter 31. As a specific example, current flow monitor 29 carries out the following processes. Subtracter 31 calculates a value of difference (Idet−Ithr). Determination unit 32 determines that this value of difference (Idet−Ithr) is an overcurrent if it is a positive number, or this value of difference (Idet−Ithr) is not an overcurrent if it is zero or smaller. Subtraction value generator 33 generates and outputs update value Dcr=Kp×(Idet−Ithr) which is proportional to the value of difference (Idet−Ithr).

Overcurrent determination data Det and update value Dcr are conveyed to limit value generator 30. Limit value generator 30 comprises subtracter 41, limiter 42, selector 43, latch 44, adder 45 and limiter 46, as shown in FIG. 2. Here, a value retained in latch 44 is conveyed as limit value L to duty limiter 25.

Subtracter 41 subtracts update value Dcr from limit value L output from latch 44, and conveys the result of subtraction to limiter 42. Limiter 42 has preset lower limit value Lmin that becomes the lower limit of limit value L. Limiter 42 outputs a result of the subtraction as it is from subtracter 41 when the result exceeds lower limit value Lmin, and limiter 42 outputs the result of the subtraction after having it changed to the value of lower limit value Lmin when the result is equal to or smaller than lower limit value Lmin. This output value of limiter 42 is supplied to one input terminal A of selector 43.

Adder 45 adds increment value Inc to limit value L output from latch 44, and conveys a result of the addition to limiter 46. Limiter 46 has preset maximum limit value Lmax that becomes the upper limit of limit value L as discussed above. Limiter 46 outputs the result of the addition by adder 45 as it is when the result is equal to or smaller than maximum limit value Lmax, and limiter 46 outputs the result of the addition after having it changed to the value of maximum limit value Lmax when the result exceeds maximum limit value Lmax. This output value of limiter 46 is supplied to another input terminal B of selector 43.

Selector 43 has selector terminal S besides input terminals A and B mentioned above. Selector 43 selectively switches one of the values supplied to input terminals A and B in response to data entered in selector terminal S. Here, selector terminal S is provided with overcurrent determination data Det. Selector 43 switches input terminal A to select the output value of limiter 42 when the result of determination given by overcurrent determination data Det shows an overcurrent. On the other hand, selector 43 switches input terminal B to select the output value of limiter 46 when the result of determination given by overcurrent determination data Det does not show an overcurrent. The selected value of selector 43 is supplied to latch 44. Latch 44 takes in the value from selector 43 at predetermined periods provided by clock signal clk, and the taken value is then output as limit value L. For example, maximum limit value Lmax is set to latch 44 in such a case as motor 10 is started to operate.

In the structure constructed as above, limit value generator 30 outputs limit value L having a value equal to maximum limit value Lmax, when motor 10 is started to operate. Input terminal B of selector 43 is kept selected thereafter for a duration in which current flow monitor 29 does not determine any overcurrent. On the other hand, limiter 46 outputs maximum limit value Lmax. During this period, therefore, limit value L output from latch 44 continues to be maximum limit value Lmax at all the time.

Next, when current value Idet exceeds threshold value Ithr, and current flow monitor 29 determines it as an overcurrent, selector 43 switches to input terminal A. On the other hand, subtracter 41 outputs a subtraction value obtained by subtracting update value Dcr from maximum limit value Lmax. This subtraction value is delivered to input terminal A of selector 43 and it is taken into latch 44 when the subtraction value is not equal to or not smaller than lower limit value Lmin. In other words, limit value L is updated at this point from maximum limit value Lmax to value (Lmax−Dcr). Limit value generator 30 carries out this process of decreasing limit value L at every clock cycle during the entire period in which the overcurrent is determined. Assuming that update value Dcr changes to value D1 and then to D2 from D0 at the point of determination of the overcurrent, to be more specific, limit value L is updated decrementally from maximum limit value Lmax to value (Lmax−D0), to another value (Lmax−D0−D1), and then to yet another value (Lmax−D0−D1−D2).

As limit value L becomes smaller, command value Dty is also limited with a smaller value, which causes current value Idet to decrease since the driving amount corresponds to the duty factor that is limited smaller. As a result, current value Idet becomes equal to threshold value Ithr or less after continuation of the process of decreasing limit value L. In the manner as described, limit value generator 30 updates limit value L at the predetermined time intervals of the clock cycles and for the value corresponding to the difference between threshold value Ithr and current value Idet at a time, in order to decrease current value Idet during the period in which current flow monitor 29 determines current value Idet as being an overcurrent.

When current value Idet becomes equal to or smaller than threshold value Ithr as a result of decreasing limit value L, current flow monitor 29 no longer determines that it is the overcurrent, and selector 43 switches the selection to input terminal B. On the other hand, adder 45 outputs an addition value obtained by adding increment value Inc to limit value L of which the value became smaller. This addition value is delivered to input terminal B of selector 43 and it is taken into latch 44 when the addition value does not exceed maximum limit value Lmax. In other words, limit value L is updated at this point in a manner to increase its value. Limit value generator 30 carries out this process of increasing limit value L at every clock cycle for a given value at each time when the overcurrent is no longer determined after limit value L has been decreased. Assuming that limit value L has value L0 at the point of no determination of the overcurrent and increment value Inc has value I, to be more specific, then limit value L is updated from value L0 to value (L0+I), to another value (L0+2×I), and then to yet another value (L0+3×I) to bring the value closer to the maximum limit value. As described, limit value generator 30 updates limit value L at the predetermined time intervals of the clock cycles and for a predetermined value given as increment value Inc at each time, in order to bring the value closer to maximum limit value Lmax when limit value L is different from maximum limit value Lmax during the period in which current flow monitor 29 does not determine the overcurrent.

When the addition value resulting from addition of increment value Inc to limit value L exceeds maximum limit value Lmax, limit value L is fixed to the value of maximum limit value Lmax by limiter 46. In other words, limit value L of duty limiter 25 is reset to the maximum limit value Lmax like that of the initial value when the operation of motor 10 resumes the state in which overcurrent is not determined occurring.

Description is provided next of the operation of motor drive device 20 constructed as above with the emphasis placed on the function of limiting command value Dty.

Figure 3A:
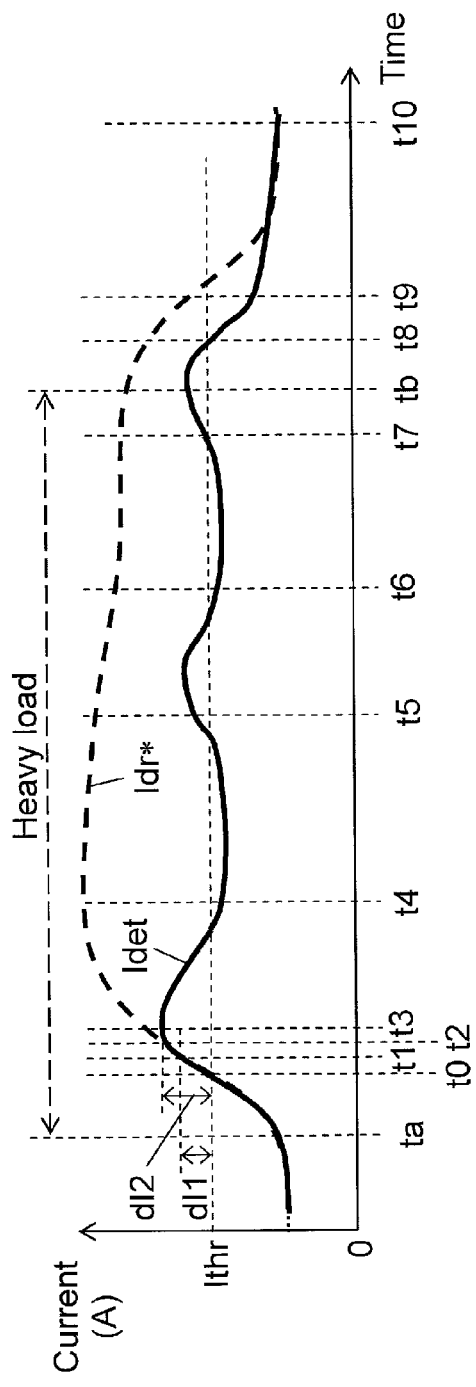
FIG. 3A is a graphic representation showing changes of current value Idet detected by a current sensor of the motor drive device.
Figure 3B:
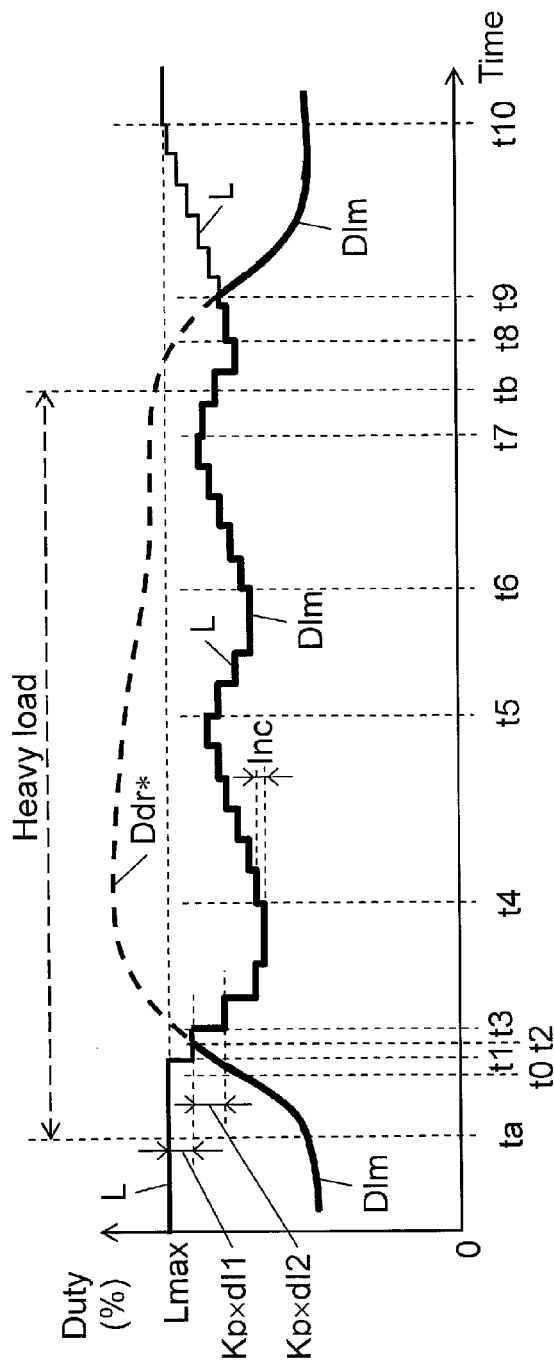
FIG. 3B is a graphic representation showing changes of limit value L and duty command value Dlm of the motor drive device.

FIGS. 3A and 3B are graphic representation showing operation of current flow monitor 29, limit value generator 30 and duty limiter 25 of motor drive device 20 according to Embodiment 1 of this invention. Shown in FIGS. 3A and 3B is one example wherein the load becomes heavier during operation of motor 10, and the current flowing through windings 11 reaches a level determined to be an overcurrent. In other words, the example shown here is a case wherein a large load is placed during the period from time ta to time tb in FIGS. 3A and 3B. FIG. 3A shows changes in current value Idet detected by current sensor 29d, and FIG. 3B shows changes in limit value L and duty command value Dlm. Also shown with dotted lines are electric current Idr* and duty command value Ddr* of a reference example which is not provided with duty limiter 25.

In FIGS. 3A and 3B, there is a state until time ta wherein current value Idet is substantially smaller than threshold value Ithr and limit value L is fixed to maximum limit value Lmax because of a light load. Therefore, command value Dty receives no limitation of limit value L, and command value Dlm is equal to command value Dty. When the load becomes heavier after the state as mentioned, current value Idet increases sharply past the point of time ta to increase the driving force of motor 10, and current value Idet exceeds threshold value Ithr at time t0.

Current flow monitor 29 then determines current value Idet as being an overcurrent at time t1 of the clock cycle since it exceeds threshold value Ithr. At the same time with this determination, current flow monitor 29 calculates a value of difference dI1 between current value Idet and threshold value Ithr at the point of time t1, and conveys update value Dcr1=Kp×dI1 to limit value generator 30. Limit value generator 30 produces a value by deducting update value Dcr1 only from the latest limit value L, which is maximum limit value Lmax, and outputs it as new limit value L in response to the determination result of the overcurrent.

Since limit value L is updated in this manner and command value Dty is increased, duty limiter 25 limits command value Dty by limit value L at time t2. In other words, the value of command value Dlm becomes limit value L at time t2, as shown in FIG. 3B.

Furthermore, at time t3, current flow monitor 29 determines current value Idet as the overcurrent since it still exceeds threshold value Ithr. Current flow monitor 29 thus calculates a value of difference dI2 between current value Idet and threshold value Ithr at the point of time t3, and conveys update value Dcr2=Kp×dI2 to limit value generator 30. Limit value generator 30 again produces a value by deducting update value Dcr2 only from the present limit value L, and outputs it as new limit value L in response to the determination result of the overcurrent. Since duty limiter 25 limits command value Dty by newly decreased limit value L, the value of command value Dlm still remains to be limit value L.

On the other hand, current value Idet that has once exceeded threshold value Ithr decreases gradually since the duty factor of PWM signal pwm is limited by limit value L. As a result, limit value L decreases as update value Dcr becomes smaller.

When current value Idet becomes equal to or smaller than threshold value Ithr after repeating such operating processes, current flow monitor 29 determines current value Idet as not an overcurrent. Then, limit value generator 30 produces a value by increasing the present limit value L by only increment value Inc, and outputs it as new limit value L as shown at time t4 in FIGS. 3A and 3B. Limit value generator 30 subsequently repeats such operation of increasing the present limit value L by only increment value Inc during the period of time t4 to time t5 in which current value Idet is equal to or smaller than threshold value Ithr.

On the other hand, the limitation of the duty factor by limit value L decreases gradually, and current value Idet exceeds threshold value Ithr again at time t5 since limit value L increases in the period from time t4 to time t5. Limit value L then decreases in the period from time t5 to time t6 due to operation similar to that from time t1 to time t4. Furthermore, limit value L increases in the period from time t6 to time t7 due to operation similar to that from time t4 to time t5.

As discussed above, the operation is repeated to increase and decrease current value Idet above and below threshold value Ithr during the period in which a heavy load is imposed. It is obvious here that current value Idet is controlled generally around threshold value Ithr, and the overcurrent suppressed when comparing current value Idet with electric current Idr* of the reference example in FIG. 3A. In this embodiment, the overcurrent to motor 10 is suppressed by the operation discussed above. In addition, the structure of this embodiment is configured such that limit value L is determined adaptively by using update value Dcr and increment value Inc instead of limiting the duty factor instantaneously and greatly at the point that the overcurrent is determined. Accordingly, the duty factor is so controlled that it is changed smoothly even when a heavy load is imposed, for instance.

In FIGS. 3A and 3B, the load placed on motor 10 gradually becomes lighter after time tb. Current value Idet also decreases with this change of the load. Limit value L begins to increase at the rate of increment value Inc at time t8 when current value Idet becomes equal to or smaller than threshold value Ithr. After time t9, command value Dty becomes equal to or smaller than limit value L, which releases the limitation of duty limiter 25 and makes command value Dlm equal to command value Dty. On the other hand, limit value L continues to increase at the rate of increment value Inc, and limit value L regains the value of maximum limit value Lmax at time t10.

Although the motor drive device described above is an exemplary structure that includes a functional block to perform digital processing, it can be of any other structure such as one adapted to operate based on processing procedures of a program and the like. In other words, the functions of subtracter 21, speed controller 22, driving amount limiter 23, duty calculator 24, duty limiter 25, speed detector 28, current flow monitor 29 and limit value generator 30 of FIG. 1 may be stored in a memory, for instance, as a program. This exemplary embodiment can be achieved by configuring such structure of a microcomputer to execute the program.

As a specific method of driving motor 10 by controlling rotational operation with a pulse-width modulated (PWM) signal pwm, the program can be configured to include the following steps. They are a step of generating drive value Tq0 for driving motor 10, a step of calculating duty command value Dty corresponding to drive value Tq0, a step of limiting duty command value Dty according to limit value L, a step of generating PWM signal pwm of a duty factor corresponding to output value Dlm provided in the limiting step for limiting by limit value L, a step of generating energizing signal uvw corresponding to PWM signal pwm and energizing winding 11 of motor 10 with energizing signal uvw, a step of monitoring current value Idet that flows through winding 11 and determining it as being an overcurrent if current value Idet exceeds predetermined threshold value Ithr, and a step of generating limit value L, wherein the step of generating limit value L is to update limit value L at predetermined time intervals and for a value corresponding to a difference between threshold value Ithr and current value Idet at a time in order to decrease current value Idet during a period in which the overcurrent is determined.

Figure 4:
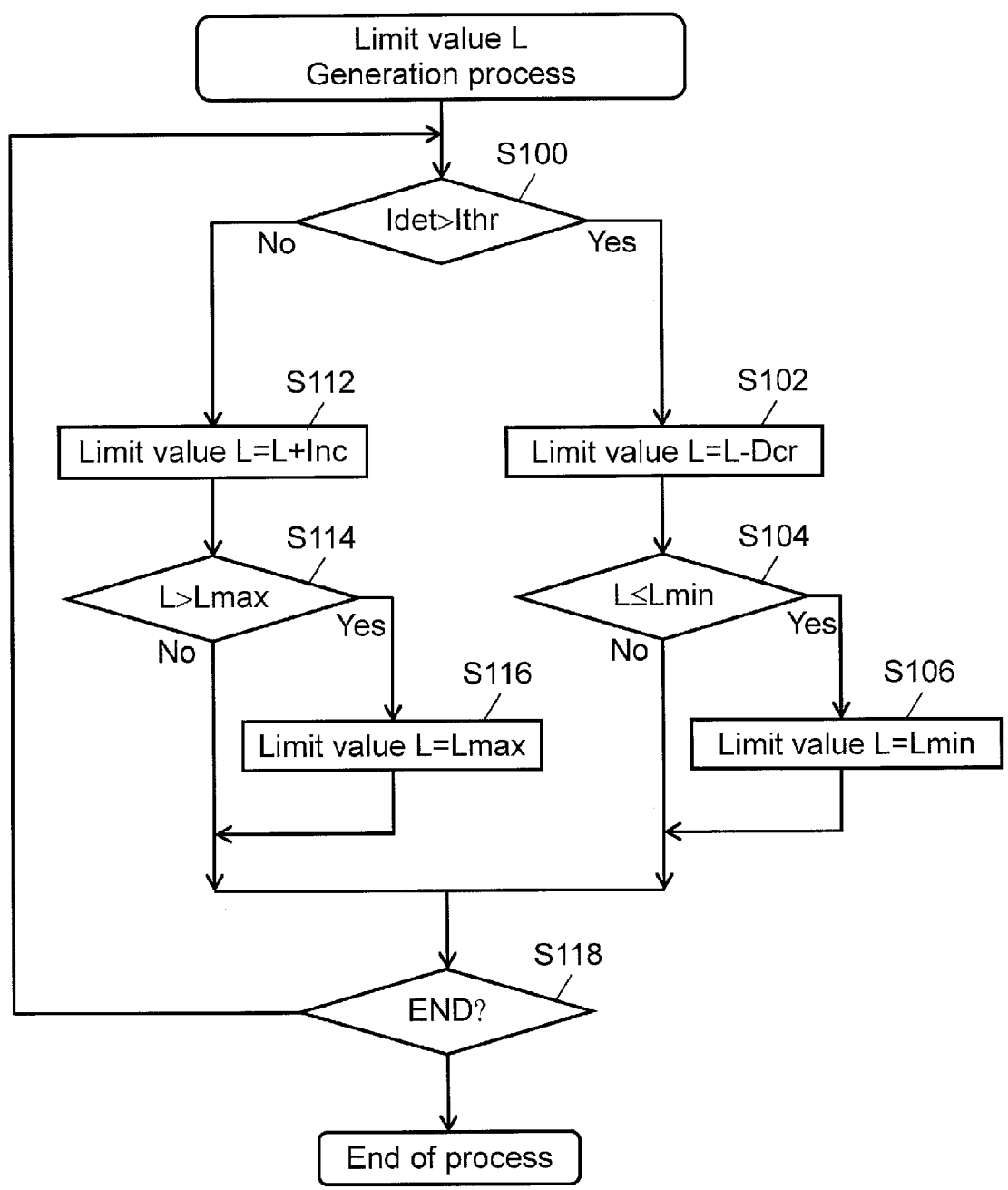
FIG. 4 is a flow chart of a process of generating the limit value of the motor drive device.

FIG. 4 is a flow chart of a process of generating limit value L of motor drive device 20 according to Embodiment 1 of the present invention. Limit value generator 30 may be configured to execute the process according to the procedure of the flow chart shown in FIG. 4. In addition, other functional blocks described above can be composed to execute the process according to the same procedure.

Upon start of the process of generating limit value L, the first step in FIG. 4 is to determine as to whether current value Idet exceeds threshold value Ithr (step S100). When current value Idet is determined as exceeding threshold value Ithr, this process advances to step S102, or the process advances to step S112 when current value Idet is determined not larger than threshold value Ithr.

When the process advances to step S102, limit value L is updated to a new value by just deducting update value Dcr from the present limit value L (step S102). New limit value L is determined as to whether it is equal to or smaller than lower limit value Lmin (step S104). When new limit value L is determined to be equal to or smaller than lower limit value Lmin, new limit value L is reset to lower limit value Lmin (step S106).

When the process advances to step S112, on the other hand, present limit value L is updated to new limit value L by adding increment value Inc only to present limit value L (step S112). Then, new limit value L is determined as to whether it exceeds maximum limit value Lmax (step S114). When new limit value L is determined to exceed maximum limit value Lmax, new limit value L is reset to maximum limit value Lmax (step S116), and the process advances to step S118. On the other hand, the process advances simply to step S118 if new limit value L is not larger than maximum limit value Lmax.

Limit value L is updated in this manner according to whether or not current value Idet exceeds threshold value Ithr, and determination is made if the process comes to an end (step S118). The same process is carried out after returning to step S100 when it is not the end of process. Limit value L can be generated by repeating the above process until directed to end.

As described above, motor drive device 20 of this embodiment is provided with limit value generator 30 for updating limit value L at the predetermined time intervals and for the value corresponding to the difference between threshold value Ithr and current value Idet at a time in order to decrease current value Idet during the period in which an overcurrent is determined. In other words, since limit value generator 30 uses update value Dcr to adaptively determine limit value L, the duty factor can be controlled such that it is changed smoothly even when a heavy load is placed, for instance. According to this embodiment, as described, the flow of overcurrent can be suppressed without causing an increase in the rotating sound of the motor since the duty factor is controlled to change smoothly.

Exemplary Embodiment 2

Figure 5:
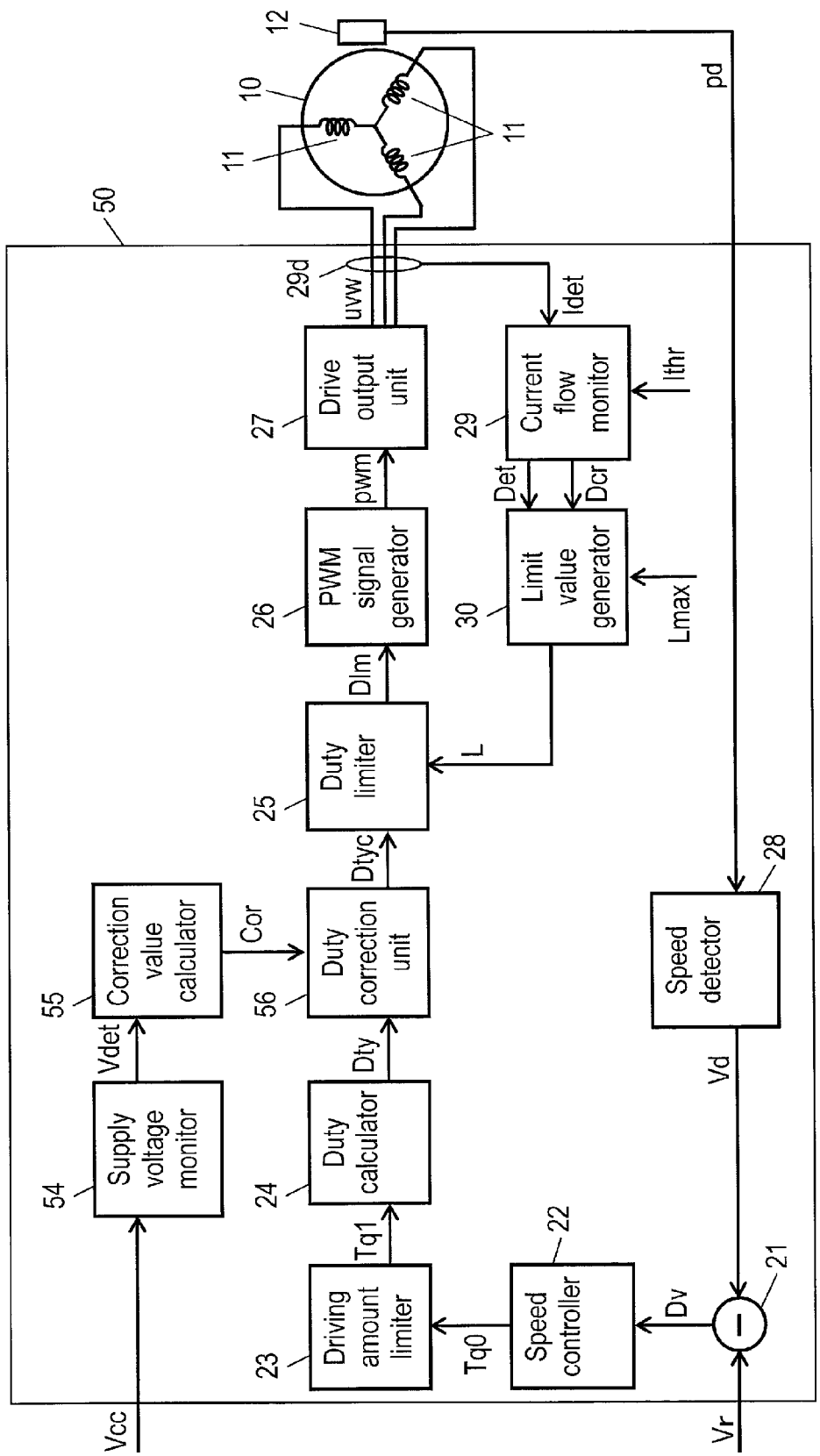
FIG. 5 is a block diagram including a motor drive device according to Exemplary Embodiment 2 of the present invention.

FIG. 5 is a block diagram showing a structure of motor drive device 50 according to Exemplary Embodiment 2 of the present invention.

In comparison with motor drive device 20 of Embodiment 1 shown in FIG. 1, motor drive device 50 additionally includes supply voltage monitor 54, correction value calculator 55 and duty correction unit 56. Other structural components identical to those of Embodiment 1 will be denoted by the same reference marks, and details of them will be skipped.

By employing such a structure, this embodiment suppresses variations of driving power to motor 10 attributed to fluctuations of the power supply voltage. That is, a pulse voltage of driving pulses changes with fluctuations of the power supply voltage delivered to drive output unit 27. This causes variations in the rotating operation of the motor since the motor is driven by a driving power corresponding to the power supply voltage even when the duty factor remains unchanged. Such variations can cause an increase in the rotating sound of the motor. In the case of a fan motor installed in an automobile for ventilation, as a specific example, a battery mounted to inside the automobile is used as the power supply to operate the fan motor. Because of so many other loads connected to this power supply besides the fan motor, the voltage of the battery changes substantially depending on operating conditions and the like of the automobile. As a result, the fan motor produces rotating sound proportional to the voltage variations, which causes an increase in the noise inside the automobile. The structure shown in FIG. 5 is hence devised in this embodiment in order to suppress the increase in the rotating sound due to such variations of the power supply voltage.

In FIG. 5, supply voltage monitor 54 monitors power supply voltage Vcc supplied to drive output unit 27, and conveys a value of supply voltage Vcc as voltage value Vdet to correction value calculator 55. Correction value calculator 55 calculates correction factor Cor that is a correction value corresponding to a magnitude of voltage value Vdet. Duty correction unit 56 makes correction of duty command value Dty calculated in duty calculator 24 according to correction factor Cor, and supplies the corrected duty command value as duty command value Dtyc to duty limiter 25.

Figure 6:
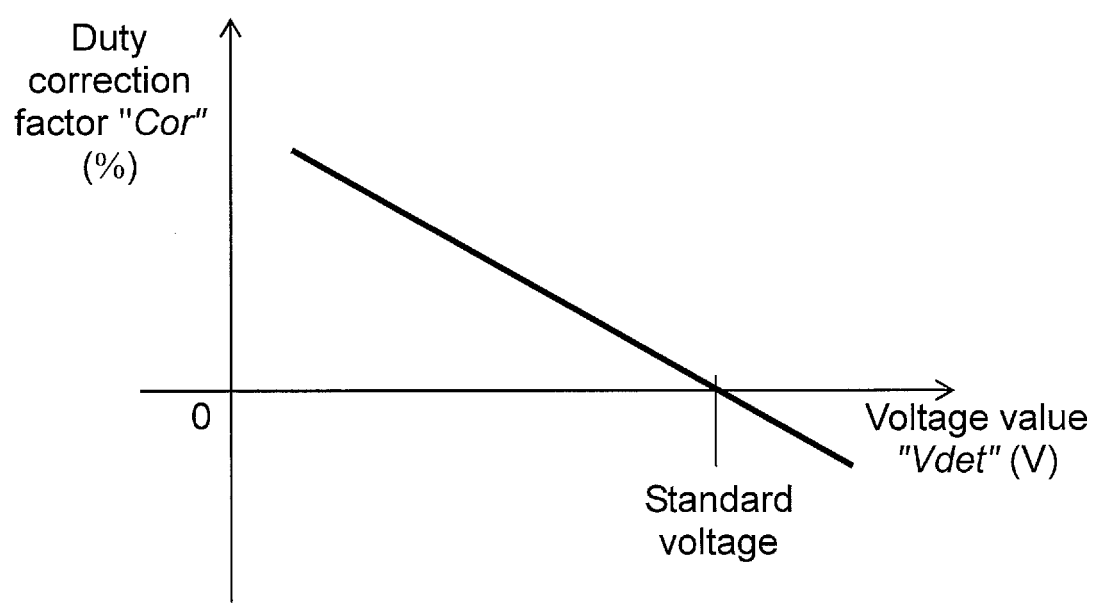
FIG. 6 is a graphic representation showing a characteristic of duty correction value to power supply voltage in a correction value calculator of the motor drive device.

FIG. 6 is a graphic representation showing the relation between voltage value Vdet and correction factor Cor. Correction value calculator 55 sets correction factor Cor to zero (0) when voltage value Vdet is at the standard voltage, and calculates correction factor Cor that decreases by a linear function of voltage value Vdet (e.g., in inverse proportion) as shown in FIG. 6. In other words, correction factor Cor is increased when power supply voltage Vcc is lower than the standard voltage, and duty correction unit 56 outputs duty command value Dtyc that is larger than duty command value Dty only by an extent of correction factor Cor. Correction value calculator 55 changes correction factor Cor to a negative value when power supply voltage Vcc is higher than the standard voltage, and duty correction unit 56 outputs duty command value Dtyc that is smaller than duty command value Dty only by the extent of correction factor Cor. As shown, duty correction unit 56 makes correction of duty command value Dty such that duty factor decreases by the linear function of voltage value Vdet (e.g., in inverse proportion). Since this makes the duty factor corrected only by an extent of the fluctuations of power supply voltage Vcc, it can reduce rotational variations of the motor corresponding to the power supply voltage.

According to this embodiment, as described, any increase in the rotating sound of the motor can be further suppressed since it reduces rotational variations of the motor attributable to the fluctuations of power supply voltage Vcc.

Exemplary Embodiment 3

Figure 7:
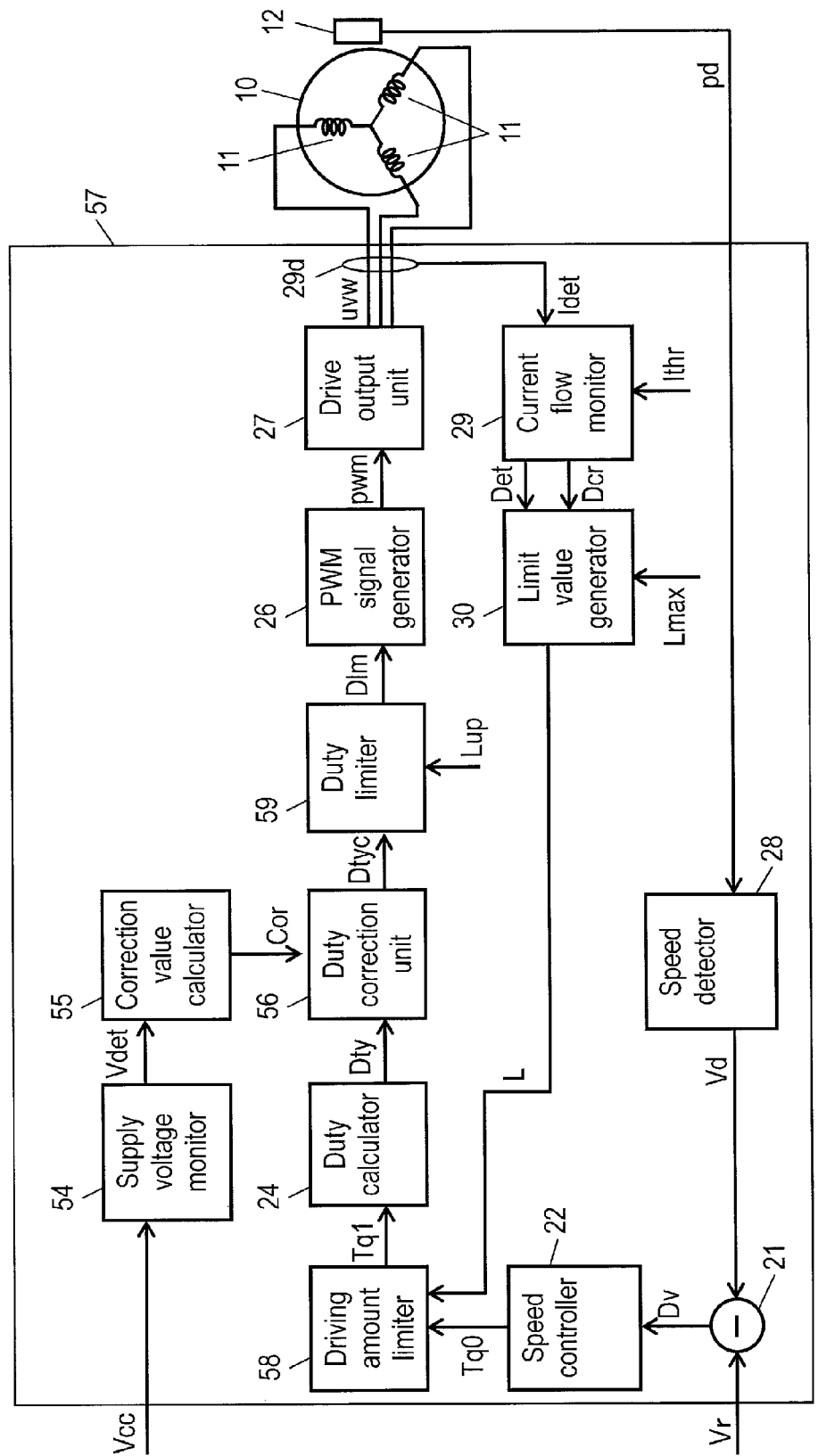
FIG. 7 is a block diagram including a motor drive device according to Exemplary Embodiment 3 of the present invention.

FIG. 7 is a block diagram showing a structure of motor drive device 57 according to Exemplary Embodiment 3 of the present invention.

In comparison with motor drive device 50 of Embodiment 2 shown in FIG. 5, motor drive device 57 has driving amount limiter 58 and duty limiter 59 of different structures from those of Embodiment 2. That is, limit value L generated by limit value generator 30 is supplied to driving amount limiter 58, as shown in FIG. 7. On the other hand, duty limiter 59 limits a range of duty command value Dtyc according to fixed limit value Lup.

In FIG. 7, driving amount limiter 58 limits a range of drive value Tq0, and controls drive value Tq0 so as to bring it equal to or smaller than a predetermined value. That is, according to this embodiment, driving amount limiter 58 limits a value of drive value Tq0 to limit value L when drive value Tq0 exceeds limit value L, and outputs it as drive value Tq1, or driving amount limiter 58 keeps drive value Tq0 as it is when drive value Tq0 does not exceed limit value L, and outputs it as drive value Tq1. On the other hand, limit value L generated by limit value generator 30 decreases stepwise from the moment when an overcurrent is determined, as described previously. Therefore, drive value Tq1 also becomes a value limited by the decreasing limit value L when the overcurrent is determined. Since duty command value Dtyc is a value corresponding to drive value Tq1, duty command value Dtyc is also suppressed stepwise. As a result, the duty factor can be controlled such that it is changed smoothly without causing sudden changes and in a large magnitude.

By employing the structure of this embodiment, a flow of overcurrent can be suppressed without causing any increase of rotating sound of the motor, since the duty factor is controlled to change smoothly.

Although the structure described in this embodiment is an example of modification made on the Embodiment 2, it may instead have driving amount limiter 23 of Embodiment 1 so composed that it limits drive value Tq0 by using limit value L.

Exemplary Embodiment 4

Figure 8:
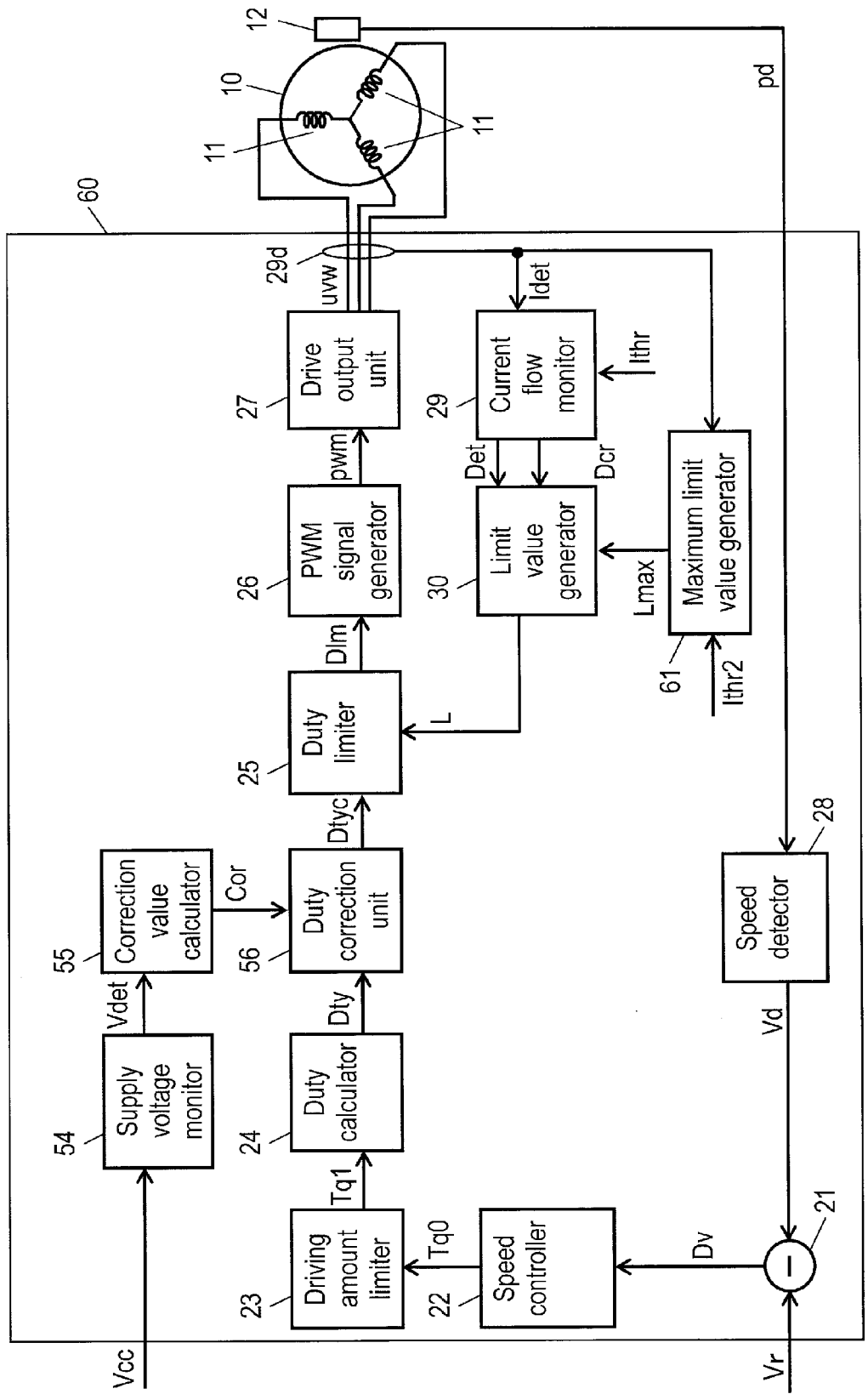
FIG. 8 is a block diagram including a motor drive device according to Exemplary Embodiment 4 of the present invention.

FIG. 8 is a block diagram showing a structure of motor drive device 60 according to Exemplary Embodiment 4 of the present invention.

In comparison with motor drive device 50 of Embodiment 2 shown in FIG. 5, motor drive device 60 further includes maximum limit value generator 61. In addition, PWM signal generator 26 in this embodiment generates a sinusoidal wave signal as the waveform signal for driving windings 11. That is, PWM signal generator 26 generates PWM signal pwm that is pulse-width modulated by a sinusoidal wave signal of amplitude based on command value Dlm. Here, structural components identical to those of Embodiment 2 will be denoted by the same reference marks, and details of them will be skipped.

This embodiment is designed to resolve a problem of insufficient torque during high-speed operation by employing the above structure, in addition to suppressing an increase in the rotating sound during operation at the normal speed. In the case of a fan motor for ventilation, in particular, wind noise of fan blades becomes larger at high rotating speed than electromagnetic noise produced by the motor. Therefore, this embodiment is to strengthen the torque instead of noise reduction when the rotating speed exceeds a predetermined value by adding simple changes to the structures of Embodiments 1 to 3.

As shown in FIG. 8, current value Idet is conveyed from current sensor 29d to maximum limit value generator 61. Maximum limit value generator 61 generates maximum limit value Lmax discussed above based on conveyed current value Idet, and transfers the generated maximum limit value Lmax to limit value generator 30. Maximum limit value generator 61 has speed determination value Ithr2 corresponding to an amount of energizing current supplied to make a certain degree of high speed rotation, wherein speed determination value Ithr2 is preset within maximum limit value generator 61 for generating maximum limit value Lmax. Maximum limit value generator 61 uses this speed determination value Ithr2 for determination of a speed, such that it determines whether the rotating speed exceeded a determination speed. This speed determination value Ithr2 has a value that is larger than threshold value Ithr preset in current flow monitor 29. Maximum limit value generator 61 outputs maximum limit value Lmax of a fixed value when current value Idet is equal to or smaller than speed determination value Ithr2. When current value Met exceeds speed determination value Ithr2, maximum limit value generator 61 outputs maximum limit value Lmax of such a value that increases in proportion to the excess amount.

Figure 9:
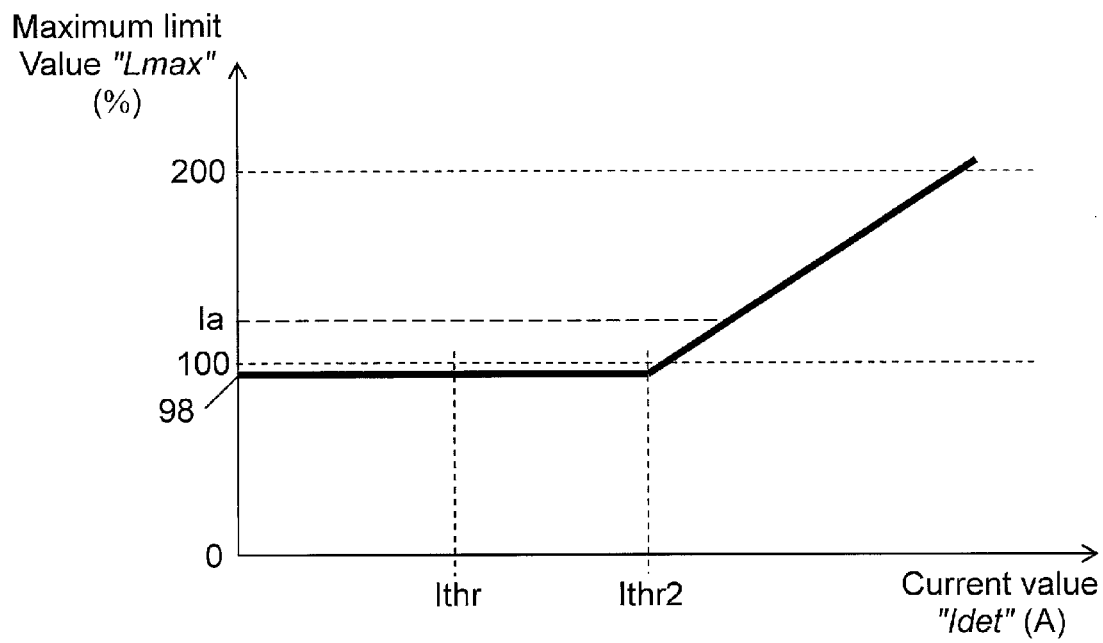
FIG. 9 is a graphic representation showing an example of maximum limit value generated by a maximum limit value generator of the motor drive device.

FIG. 9 is a graphic representation showing an example of maximum limit value Lmax generated in the above manner by maximum limit value generator 61.

As shown in FIG. 9, maximum limit value Lmax has a constant value that renders the duty factor of 98%, for instance, when current value Idet is equal to or smaller than speed determination value Ithr2. In other words, limit value L in this case is equal to maximum limit value Lmax to keep the duty factor of 98%, and that this limit value L is decreased at the rate of update value Dcr from the duty factor of 98% when an overcurrent is determined, in the same manner as Embodiments 1 to 3. Subsequently, when the overcurrent is no longer determined, limit value L is updated at the rate of increment value Inc until it reaches maximum limit value Lmax corresponding to the duty factor of 98% unless the overcurrent is determined again.

On the other hand, when current value Idet exceeds speed determination value Ithr2, maximum limit value Lmax being set becomes such a value that increases in proportion to current value Idet from the value that renders the duty factor of 98%, as shown in FIG. 9. In the case where current value Idet is equal to or smaller than speed determination value Ithr2, maximum limit value Lmax being set comes to a value that renders the duty factor of 98% for instance, which is close to 100%. As a result, the maximum limit value Lmax becomes a virtual value that exceeds 100% when current value Idet exceeds speed determination value Ithr2. That is, in the case where current value Idet exceeds speed determination value Ithr2, limit value L also becomes such a value that exceed 100%, which leads the limiting function of duty limiter 25 to become not effective. As a result, PWM signal pwm output from PWM signal generator 26 is limited by the duty factor of 100% when current value Idet exceeds speed determination value Ithr2, and it becomes a signal of such shape as if it is PWM modulated with a waveform signal resembling a trapezoidal wave during the period when the sinusoidal wave signal has a large amplitude.

Figure 10:
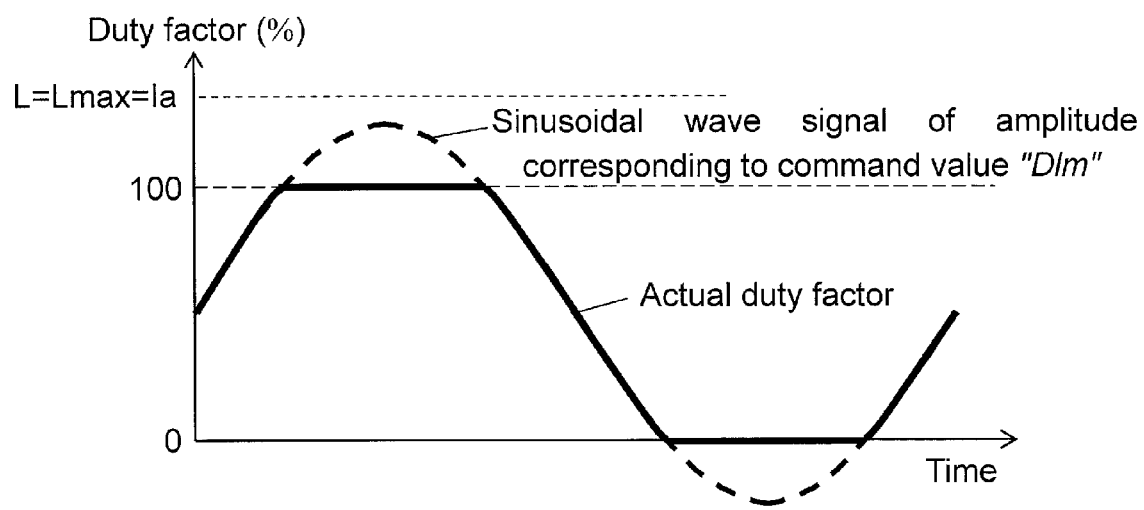
FIG. 10 is an illustration showing a pattern of a PWM signal when a current value of the motor drive device exceeds a speed determination value.

FIG. 10 is a drawing illustrating a pattern of PWM signal pwm when current value Idet exceeds speed determination value Ithr2. Note that the pattern shown in FIG. 10 is not an actual pulse signal but is a duty factor of PWM signal pwm. When current value Idet exceeds speed determination value Ithr2, maximum limit value Lmax and limit value L reaches value 1a that causes the duty factor to exceed 100%, as shown in FIG. 10. It becomes unlikely for this reason that command value Dtyc is limited by duty limiter 25, and command value Dlm output from duty limiter 25 also reaches a value exceeding the duty factor of 100%. PWM signal generator 26 generates a sinusoidal wave signal of the amplitude corresponding to command value Dlm illustrated by the dotted line in FIG. 10, since the amplitude of the sinusoidal wave signal generated by PWM signal generator 26 is determined by such command value Dlm. On the other hand, any value exceeding the 100% duty factor is a virtual value, and the actual duty factor is limited within the range of 0% and 100% inclusive, as mentioned previously. In other words, the actual duty factor of PWM signal pwm output from PWM signal generator 26 is limited to the upper limit of 100% and the lower limit of 0% as shown by the solid line in FIG. 10. Therefore, the electric current to energize windings 11 according to PWM signal pwm is driven by a waveform resembling the trapezoidal wave shown by the solid line in FIG. 10. Such trapezoidal wave becomes more analogous to a rectangular waveform with increase in command value Dlm.

When sinusoidal wave drive and rectangular wave drive are compared here, the rectangular wave drive can produce a larger torque than the sinusoidal wave drive. In other words, this embodiment is designed to determine that the rotation is at a high speed when current value Idet exceeds speed determination value Ithr2, and controls in a manner to increase limit value L. This causes command value Dlm to become a value exceeding the duty factor of 100%. As a result, the electric current supplied to windings 11 is driven by the waveform resembling the trapezoidal wave, to thereby produce a larger torque of driving as compared to the sinusoidal wave driving. This embodiment thus achieves strengthening of the torque instead of reducing noise during high-speed rotation.

Figure 11:
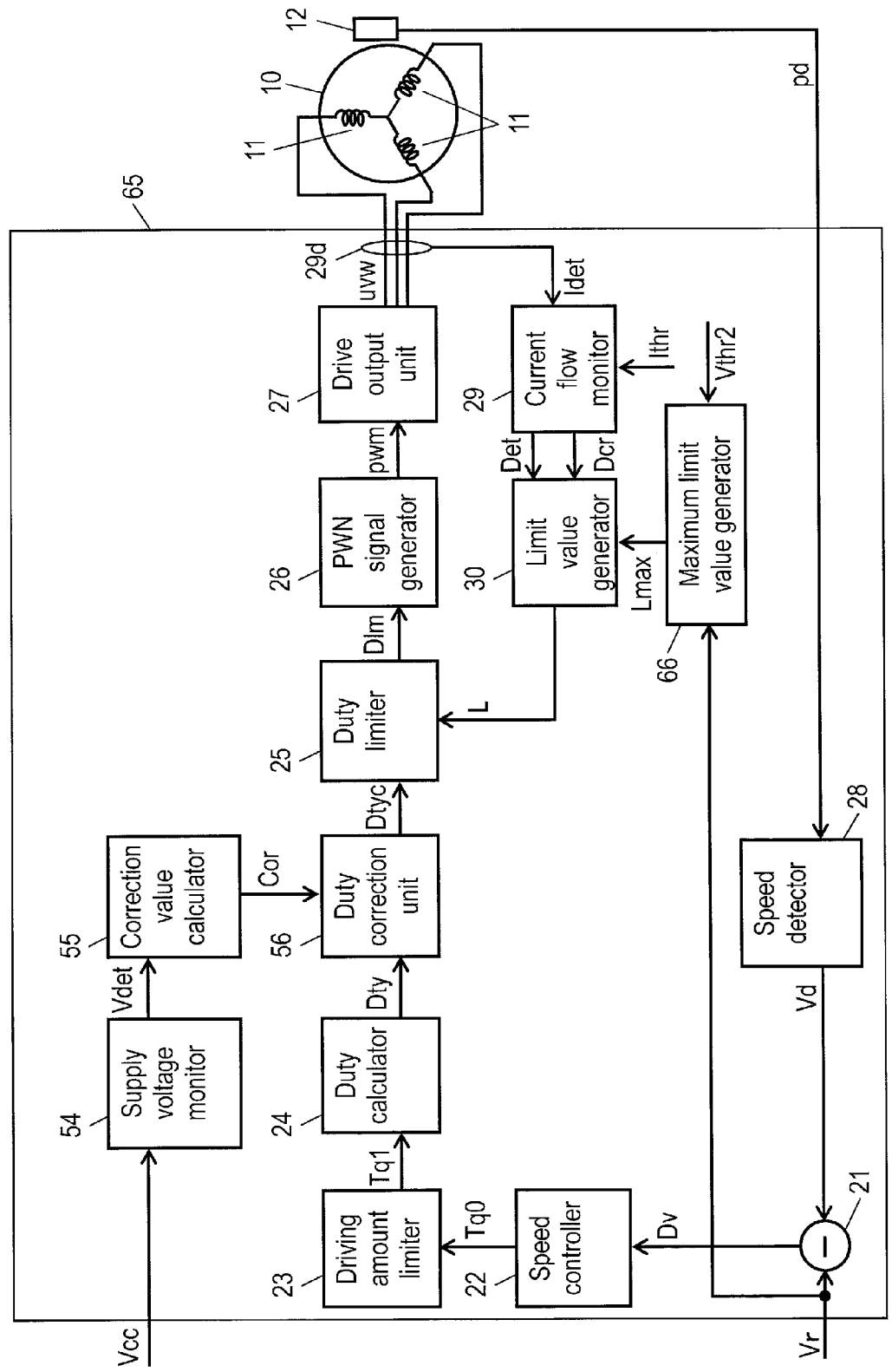
FIG. 11 is a block diagram showing another structure of the motor drive device.
Figure 12:
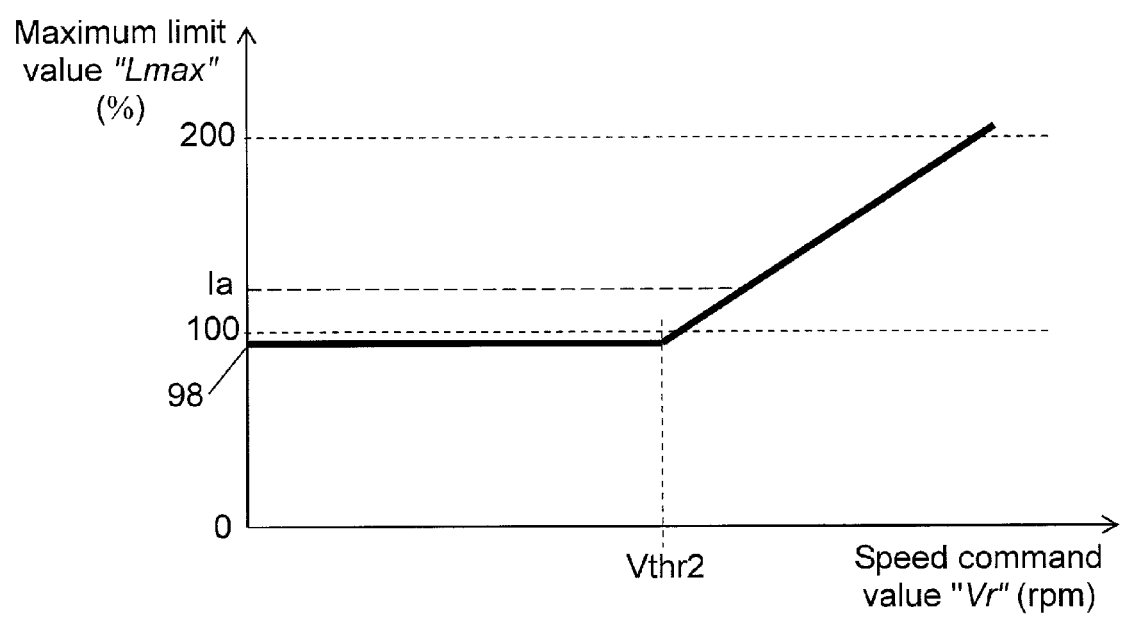
FIG. 12 is a graphic representation showing another example of maximum limit value generated by the maximum limit value generator of the motor drive device.

FIG. 11 is a block diagram showing another structure of motor drive device according to Embodiment 4 of the present invention, and FIG. 12 is a graphic representation showing another example of maximum limit value Lmax generated by maximum limit value generator 66.

When compared with motor drive device 60 of FIG. 8, motor drive device 65 shown in FIG. 11 has maximum limit value generator 66 adapted to receive speed command value Vr. Maximum limit value generator 66 has speed determination value Vthr2 corresponding to a speed, which is preset therein for generating the maximum limit value Lmax. As shown in FIG. 12, maximum limit value generator 66 outputs maximum limit value Lmax of a fixed value when speed command value Vr is equal to or smaller than speed determination value Vthr2. On the other hand, when speed command value Vr exceeds speed determination value Vthr2, maximum limit value generator 66 outputs maximum limit value Lmax of which the value increases in proportion to the excess amount.

Since the structure configured above controls limit value L to increase at high-speed rotation, it can render command value Dlm that exceeds the duty factor of 100%. As a result, the electric current supplied to windings 11 is driven by the waveform resembling the trapezoidal wave, and it thereby produces a larger torque of driving than that of the sinusoidal wave driving.

As discussed above, the motor drive device of this embodiment additionally comprises the maximum limit value generator that provides maximum limit value Lmax of a fixed value when rotating speed of motor 10 is equal to or smaller than a determination speed, or it provides maximum limit value Lmax of such a value that increases in proportion to an amount in excess of maximum limit value Lmax when the rotating speed of motor 10 exceeds the determination speed. This structure is designed to resolve a problem of insufficient torque during high-speed rotation while also suppressing increase in the rotating noise during operation at the normal speed.

Although the structure described here is an example in which the maximum limit value generator is added to the structure of Embodiment 2 shown in FIG. 5, similar advantageous effects can be achieved by any of the structures of Embodiment 1 shown in FIG. 1 and Embodiment 3 shown in FIG. 7 with addition of a maximum limit value generator.

Exemplary Embodiment 5

Figure 13:
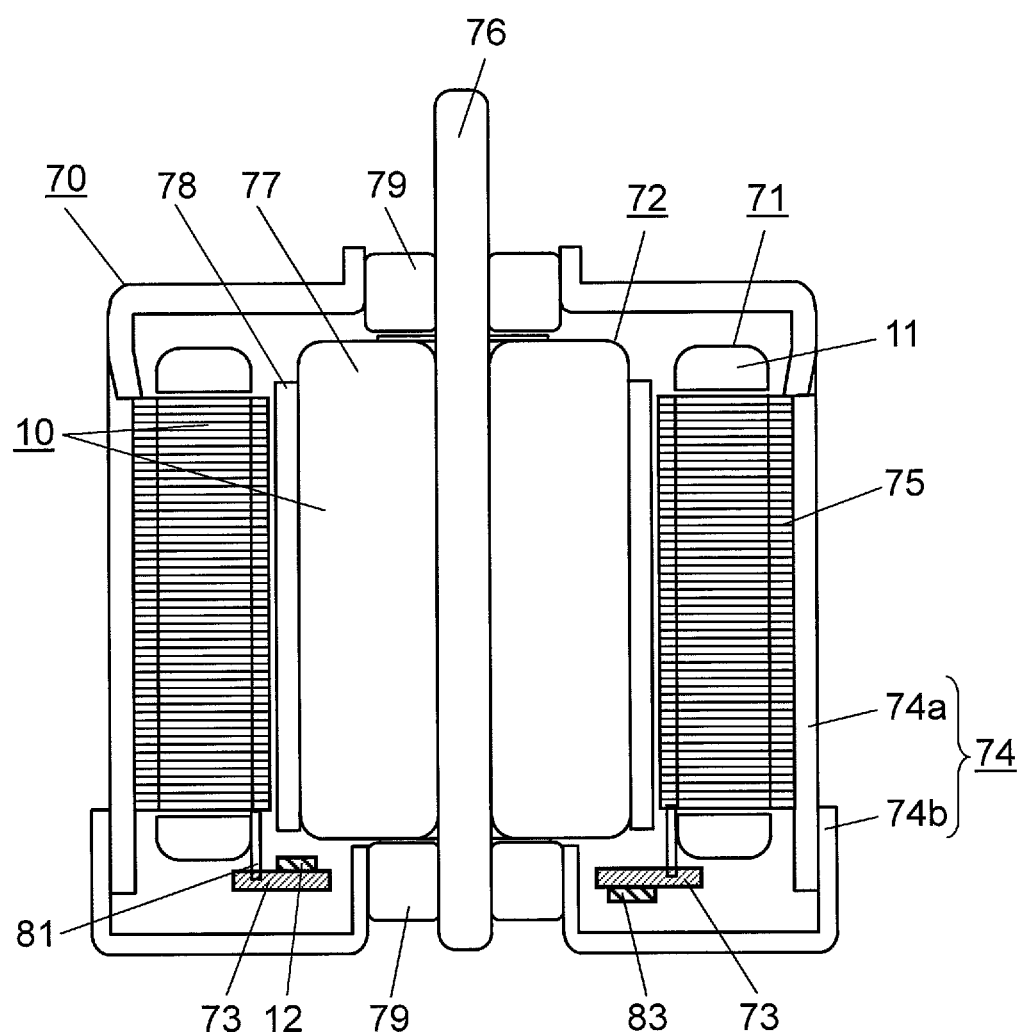
FIG. 13 is a schematic view of a brushless motor according to Exemplary Embodiment 5 of the present invention.

FIG. 13 is a schematic view of brushless motor 70 according to Exemplary Embodiment 5 of the present invention. Brushless motor 70 of this embodiment is characterized by having therein equipped with one of the motor drive devices of Embodiment 1 and Embodiment 2. Description provided in this embodiment represents an example of inner-rotor type brushless motor provided with a rotor disposed rotatably inside a stator.

As shown in FIG. 13, brushless motor 70 comprises stator 71, which is a stationary part, rotor 72, which is a rotary part, circuit board 73 and motor casing 74. Motor casing 74 is formed of a metal having a sealed cylindrical shape, and a structure of brushless motor 70 comprises stator 71, rotor 72 and circuit board 73 enclosed inside motor casing 74. Motor casing 74 comprises main body case 74a and case cover 74b, wherein case cover 74b is attached to main body case 74a to complete generally sealed motor casing 74.

In FIG. 13, stator 71 is constructed of individual phases of windings 11 wound around stator core 75. Description provided in this embodiment is an example, in which windings 11 wound on stator core 75 are separated into three phases, i.e., phase U, phase V and phase W, which are shifted in the phase by 120 degrees with respect to each other. Stator core 75 has a plurality of protruding poles that project inward. The outer peripheral side of stator core 75 has generally a cylindrical shape, and the outer periphery is fixed to main body case 74a.

Rotor 72 is inserted in stator 71 with a gap between them. Rotor 72 has permanent magnet 78 of a cylindrical shape held on the outer periphery of rotor frame 77, and disposed in a rotatable manner about rotary shaft 76 supported by bearings 79. In other words, rotor 72 is so disposed that end faces of the protruding poles of stator core 75 and the outer periphery of permanent magnet 78 confront each other.

In addition, brushless motor 70 has circuit board 73 mounting various circuit components 83, and it is housed inside of motor casing 74. These circuit components 83 make up a motor drive device that can be any of motor drive device 20 described in Embodiment 1, motor drive device 50 described in Embodiment 2, motor drive device 57 described in Embodiment 3, motor drive device 60 described in Embodiment 4 and motor drive device 65 also described in Embodiment 4. Circuit board 73 also includes position sensor 12 comprising a hall element and the like mounted thereon for detecting a rotating position of rotor 72. There is support member 81 attached to stator core 75, and circuit board 73 is fixed inside motor casing 74 via support member 81. Terminal ends of individual windings 11 of phase U, phase V and phase W extend from stator 71, and these terminals are connected to circuit board 73.

To complete such a structure, stator 71 is inserted first into main body case 74a and fixed to the inner surface of main body case 74a, and case cover 74b is secured to main body case 74a after rotor 72 and circuit board 73 are housed inside main body case 74a to form brushless motor 70 provided with position sensor 12 and the motor drive device built therein. Brushless motor 70 thus comprises integrally assembled motor 10 including stator 71 and rotor 72, position sensor 12 and the motor drive device.

As described, brushless motor 70 has the structure comprising rotor 72 which holds permanent magnet 78 and disposed rotatably about rotary shaft 76, stator 71 provided with windings 11 wound on stator core 75 which has a plurality of protruding poles, and one of the motor drive devices in Embodiments 1 to 4. Brushless motor 70 is capable of suppressing an overcurrent without causing any increase in the rotating sound of the motor since it has the motor drive device of the above structure.

As has been described, the motor drive device of the present invention comprises a drive controller, a duty calculator, a duty limiter, a PWM signal generator, a drive output unit, a current flow monitor and a limit value generator. The drive controller generates a driving signal to drive a motor. The duty calculator calculates a duty command value corresponding to the driving signal. The duty limiter limits the duty command value to a value by a limit value. The PWM signal generator generates a PWM signal of a duty factor corresponding to an output value of the duty limiter. The drive output unit generates an energizing signal corresponding to the PWM signal, and energizes a winding of the motor with the energizing signal. The current flow monitor monitors a current value that flows through the winding, and determines it as an overcurrent if the current value exceeds a predetermined threshold value. The limit value generator generates the limit value. The limit value generator is so configured that it updates the limit value at predetermined time intervals and for a value corresponding to a difference between the threshold value and the current value at a time, in order to decrease the current value during the period in which the overcurrent is determined.

The brushless motor of the present invention has a structure equipped with a motor drive device of the above type.

Furthermore, a motor drive method of the present invention comprises the following steps. They are a step of generating a driving signal to drive a motor, a step of calculating a duty command value corresponding to the driving signal, a step of limiting the duty command value to a value by a limit value, a step of generating a PWM signal of a duty factor corresponding to an output value provided in the limiting step for limiting by the limit value, a step of generating an energizing signal corresponding to the PWM signal and energizing a winding of the motor with the energizing signal, a step of monitoring a current value that flows through the winding and determining it as an overcurrent if the current value exceeds a predetermined threshold value, and a step of generating the limit value, wherein the step of generating the limit value is to update the limit value at predetermined time intervals and for a value corresponding to a difference between the threshold value and the current value at a time, in order to decrease the current value during the period in which the overcurrent is determined.

According to this structure, the duty command value can be limited while avoiding sudden and large changes of the duty factor. Thus provided are the motor drive device, the brushless motor and the motor drive method having the function of limiting a current likely to become an overcurrent without causing an increase of rotating sound of the motor.

Although the description provided in each of the above embodiments is the speed control system as an example of control systems, like advantageous effects can be achieved even when the speed control system is replaced with a system structure consisting of a position control system.

In addition, the above system structure may include a position sensor for detecting a position of motor load, although each of the embodiments illustrates the exemplary structure having the position sensor for detecting a position of the rotor and the speed detector for converting the detected position into a speed detection signal. Moreover, the structure may be such that a position is controlled with a position control system based on an amount of positional deviation between a directed position command signal and a position indication signal from the position sensor. Furthermore, the structure may comprise a position control system provided with a speed detector including a circuit that obtains a detected position by integrating detected speeds. In short, the present invention can be applied to a control system that executes feedback control according to driving amount based on a value of deviation between a command signal and a detected signal so as to make moving operation of the rotor by the motor follow an amount of movement in the directed position, speed and the like. The present invention can also be applied to a structure that directly controls a moving amount according to a driving amount based on the command signal. Furthermore, the moving operation can be a rotary movement, linear movement or any other mode of operation of the rotor by the motor.

INDUSTRIAL APPLICABILITY

Motor drive device, brushless motor and motor drive method according to the present invention are suitable especially for fan motors and the like for which a high-speed response is not required, and they are useful as fan motors for household appliance and electrical equipment, motor drive devices for other motors and brushless motors because of their function of limiting amount of overcurrent without causing any increase of rotating sound of the motors.

The invention claimed is:

1. A motor drive device for controlling rotational operation of a motor by using a pulse-width modulated PWM signal, the device comprising:
   a drive controller for generating a driving signal to drive the motor;
   a duty calculator for calculating a duty command value corresponding to the driving signal;
   a duty limiter for limiting the duty command value to a value according to a limit value;
   a PWM signal generator for generating the PWM signal of a duty factor corresponding to an output value of the duty limiter;
   a drive output unit for generating an energizing signal corresponding to the PWM signal, and energizing a winding of the motor with the energizing signal;
   a current flow monitor for monitoring a current value that flows through the winding, and determining the current value as being an overcurrent when the current value exceeds a predetermined threshold value; and a limit value generator for generating the limit value, wherein the limit value generator updates the limit value at predetermined time intervals and for a value corresponding to a difference between the threshold value and the current value at a time, in order to decrease the current value during a period in which the overcurrent is determined.

2. The motor drive device of claim 1, wherein the limit value generator has a maximum limit value set therein, and updates the limit value at predetermined time intervals and at the rate of a predetermined value in a manner to bring the limit value closer to the maximum limit value when the limit value is different from the maximum limit value during a period in which the overcurrent is not determined by current flow monitor.

3. The motor drive device of claim 2, wherein the duty limiter outputs an output value that limits the duty command value to become equal to or smaller than the limit value when the duty command value exceeds the limit value, and the limit value generator decreases the limit value step by step at the rate of a value corresponding to a difference between the threshold value and the current value during the period in which the overcurrent is determined, and increases the limit value step by step at the rate of a predetermined value up to an upper limit of the maximum limit value during the period in which the overcurrent is not determined.

4. A brushless motor comprising a rotor that retains a permanent magnet and is disposed rotatably about a rotary shaft, a stator provided with a winding wound on a stator core having a plurality of protruding poles, and a motor drive device recited in claim 3.

5. The motor drive device of claim 2 further comprising a maximum limit value generator for generating the maximum limit value, wherein the maximum limit value generator sets the maximum limit value to a fixed value when rotating speed of the motor is equal to or smaller than a determination speed, and to a value that increases in proportion to an amount in excess of the maximum limit value when rotating speed of the motor exceeds the determination speed.

6. The motor drive device of claim 5, wherein the maximum limit value generator determines the rotating speed of the motor based on the current value from the current flow monitor.

7. A brushless motor comprising a rotor that retains a permanent magnet and is disposed rotatably about a rotary shaft, a stator provided with a winding wound on a stator core having a plurality of protruding poles, and a motor drive device recited in claim 6.

8. A brushless motor comprising a rotor that retains a permanent magnet and is disposed rotatably about a rotary shaft, a stator provided with a winding wound on a stator core having a plurality of protruding poles, and a motor drive device recited in claim 5.

9. A brushless motor comprising a rotor that retains a permanent magnet and is disposed rotatably about a rotary shaft, a stator provided with a winding wound on a stator core having a plurality of protruding poles, and a motor drive device recited in claim 2.

10. The motor drive device of claim 1 further comprising a supply voltage monitor for monitoring a voltage value of power supply supplied to the drive output unit, and a duty correction unit for correcting the duty command value calculated in the duty calculator according to a magnitude of the voltage value and supplying the corrected duty command value to the duty limiter, wherein the duty correction unit makes correction of the duty command value so as to decrease the duty factor by a linear function of the voltage value.

11. A brushless motor comprising a rotor that retains a permanent magnet and is disposed rotatably about a rotary shaft, a stator provided with a winding wound on a stator core having a plurality of protruding poles, and a motor drive device recited in claim 10.

12. The motor drive device of claim 1 further comprising a driving amount limiter for receiving the limit value generated and supplied from the limit value generator, and for limiting a value of the driving signal according to the limit value, wherein the driving amount limiter supplies a signal produced by limiting the driving signal to the duty calculator, and the duty limiter limits the duty command value according to the limit value having a fixed value.

13. A brushless motor comprising a rotor that retains a permanent magnet and is disposed rotatably about a rotary shaft, a stator provided with a winding wound on a stator core having a plurality of protruding poles, and a motor drive device recited in claim 12.

14. A brushless motor comprising a rotor that retains a permanent magnet and is disposed rotatably about a rotary shaft, a stator provided with a winding wound on a stator core having a plurality of protruding poles, and a motor drive device recited in claim 1.

15. A motor drive method for driving and controlling rotational operation of a motor by using a pulse-width modulated PWM signal, the method comprising the steps of:

generating a driving signal to drive the motor;

calculating a duty command value corresponding to the driving signal;

limiting the duty command value to a value according to a limit value;

generating the PWM signal of a duty factor corresponding to an output value provided in the step of limiting by the limit value;

generating an energizing signal corresponding to the PWM signal and energizing a winding of the motor with the energizing signal;

monitoring a current value that flows through the winding and determining the current value as being an overcurrent if the current value exceeds a predetermined threshold value; and generating the limit value, wherein the step of generating the limit value is to update the limit value at predetermined time intervals and for a value corresponding to a difference between the threshold value and the current value at a time, in order to decrease the current value during a period in which the overcurrent is determined.

* * * * *